United States Patent
Raetzsch et al.

US006136926A

[11] Patent Number: 6,136,926
[45] Date of Patent: *Oct. 24, 2000

[54] CROSS-LINKABLE, OLEFINIC POLYMERS AND METHODS FOR THEIR SYNTHESIS

[75] Inventors: Manfred Raetzsch, Kirschlag; Achim Hesse, Linz; Harmut Bucka, Eggendorf; Dirk Leistner, Vienna, all of Austria; Sergej Ivanchev, St. Petersburg, Russian Federation; Saul Heikin, St. Petersburg, Russian Federation; Alla Mesh, St. Petersburg, Russian Federation; Moisej Pukschanski, St. Petersburg, Russian Federation

[73] Assignee: Borealis GmbH, Schwechat-Mannswoerth, Austria

[ * ] Notice: This patent issued on a continued prosecution application filed under 37 CFR 1.53(d), and is subject to the twenty year patent term provisions of 35 U.S.C. 154(a)(2).

[21] Appl. No.: 08/898,592

[22] Filed: Jul. 22, 1997

[30] Foreign Application Priority Data

Jul. 22, 1996 [DE] Germany ............................ 196 29 429
Jul. 22, 1996 [DE] Germany ............................ 196 29 427

[51] Int. Cl.[7] .................................................. C08F 255/02
[52] U.S. Cl. .......................... 525/254; 525/259; 525/262; 525/266; 525/288
[58] Field of Search ............................ 524/535; 525/257, 525/260, 263, 265, 288, 254

[56] References Cited

U.S. PATENT DOCUMENTS

| | | | |
|---|---|---|---|
| 5,350,812 | 9/1994 | Sultan et al. ............................ | 525/288 |
| 5,741,858 | 4/1998 | Brann et al. ............................ | 525/288 |

FOREIGN PATENT DOCUMENTS

| | | | |
|---|---|---|---|
| 55-165973 | 12/1980 | Japan ..................................... | 525/288 |
| 58-132013 | 8/1983 | Japan ..................................... | 525/288 |
| 58-217532 | 12/1983 | Japan ..................................... | 524/535 |
| 59-36115 | 2/1984 | Japan ..................................... | 525/288 |
| 59-139233 | 8/1984 | Japan ..................................... | 525/288 |
| 60-1236 | 1/1985 | Japan ..................................... | 524/535 |
| 3-50251 | 3/1991 | Japan ..................................... | 525/288 |

*Primary Examiner*—Fred Zitomer
*Attorney, Agent, or Firm*—Jordan and Hamburg LLP

[57] ABSTRACT

Cross-linkable, olefinic polymers synthesized from mixtures of olefinic polymers and ethylenically unsaturated organosilane compounds, which can be grafted, by a 2-step method using thermally decomposing free radical-forming agents by heating the mixtures to a temperature of 30° to 110° C. below the softening temperature or the crystallite melting point of the olefinic polymers used and subsequently heating the mixtures to a reaction temperature of 10° to 60 ° C. below the softening temperature or the crystallite melting point of the olefinic polymers used. In the alternative, they can be grafted by a method involving the action of ionizing radiation with simultaneous absorption of organosilane compounds and the action of radiation. The method is suitable for producing films, sheets, fibers, panels, coatings, pipes, hollow objects, foamed materials and molded articles.

26 Claims, No Drawings

CROSS-LINKABLE, OLEFINIC POLYMERS AND METHODS FOR THEIR SYNTHESIS

BACKGROUND OF THE INVENTION

The invention relates to cross-linkable, olefinic polymers from olefinic polymers and ethylenically unsaturated organosilane compounds, as well as to methods for their synthesis.

For various applications, the properties of olefinic polymers, such as polyethylene (PE), polypropylene (PP), 1-polybutene (PB), poly-4-methylpentene (PMP), polystyrene (PS) and of the corresponding copolymers are inadequate. In particular, the strength, toughness, dimensional stability under heat and the resistance to various chemicals of these polymers do not satisfy many requirements in the field of producing structural parts.

By introducing covalent bridging bonds between the polymer chains by way of chain branchings and cross linkings, the property spectrum of these polymers can be extended. For example, the cross linking of PE causes the toughness and dimensional stability under heat to be increased over that of the original material and the resistance to chemicals to be improved. For some applications, partial cross linking of the polymer is also sufficient or advantageous, for example, when a higher melt viscosity is required.

On the one hand, the formation of covalent bonds between chains of olefinic polymers is achieved according to the state of the art by free radical linking reactions. The linking can take place here by a combination of two chain radicals, which have come about by reaction with free radicals of decomposed peroxides or azo compounds or by the action of high-energy radiation and/or by the reaction of the chain radicals with di-unsaturated or polyunsaturated organic compounds, such as divinylbenzene, phenyl bis(maleic imide) or pentaerythritol tetraethyl ether. The latter are known as common cross-linking reagents.

A further variation of covalent linkage are condensations between functional groups of the polymers, which either are incorporated as comonomers in the polymer chain or bound to the polymer chain by grafting reactions. For example, PE can be functionalized by free radical grafting with vinyltrialkoxysilanes. By a subsequent, catalyzed hydrolysis and a catalyzed condensation, the PE is cross linked over siloxane bridges (Plastics and Rubber Processing and Applications 13 (1990) 81–91).

According to the state of the art, the grafting of olefinic polymers with ethylenically unsaturated organosilane compounds takes place with addition of thermally decomposing free radical-forming agents or under the action of ionizing radiation. The reaction can take place in inert solvents, in the melt or in the particulate, solid polymer. Grafting in solution is very expensive and has not gained any economic importance.

The grafting of organosilane compounds on polyolefins in the melt for the synthesis of polyolefins, cross-linkable by way of grafted organosilane compounds, is used industrially in the presence of peroxides as thermally decomposing free radical-forming agents only for polyethylene and ethylene copolymers. However, because of various side reactions, there are disadvantages. For example, during the free radical silane grafting of polyethylene in the melt, the formation of cross-linked portions by a combination of free PE chain radicals takes place. This may interfere with processing because of a lower melt index. A direct transfer of this method to polypropylene fails owing to the fact that, because of the tertiary carbon atoms in the molecular structure of the polypropylene at higher temperatures, P chain splitting takes place (Fritz, H., Polymerwerkstoffe Merseburg 1994, 23–32) and the peroxide initiated decomposition of the polypropylene chain predominates over the peroxide grafting of the organosilane compound (Ambrosh, I., "Polypropylen", published by Khimiya Moscow, 1967, page 125). The discoloration of the polymers, which frequently occurs during the melt grafting reaction, is also a disadvantage.

According to the German patent 2617108, in the first step of melt grafting, the ethylenically unsaturated organosilane compound, the free radical forming agent and other additives diffuse under the intensive mixing of the components at 60° to 100° C. The grafting of the ethylenically unsaturated organosilane compound, initiated by the free radical-forming agent, takes place in the second step of melt grafting in the extruder at 180° to 220° C.

The diffusion of the ethylenically unsaturated organosilane compound and of the peroxide are not always carried out as separate steps of the method.

According to J5434799, for a single step extrusion method, the ethylenically unsaturated organosilane compound and the peroxide are metered simultaneously with the olefinic polymer into the extruder and the free radical grafting is initiated with melting of olefinic polymer, mixing of the components and a rise in the temperature.

As a result of the inadequate homogenization of the olefinic polymer, the ethylenically unsaturated organosilane compound and the free radical-forming agent, this technology of the German patent 2617108 and of J5434799 has the disadvantage that cross linking takes place in local regions and results in difficulties during the processing.

Furthermore, for the grafting of organosilane compounds initiated by peroxides, a thermooxidative degradation of the olefinic polymers cannot be excluded at reaction temperatures above 200° C., while the addition of stabilizers brings out about a decrease in the degree of grafting of the organosilane compound (Voight, I., "Stabilization of Synthetic Polymers Against the Effects of Light and Heat", published by Khimiya Moscow 1972, P.59).

The highly toxic splitting products, which are formed by a series of peroxides and which lead to a decrease in the dielectric properties of the final products, are an additional problem.

The grafting of ethylenically unsaturated monomers, including ethylenically unsaturated organosilane compounds, to olefinic polymers in the solid phase in the presence of thermally decomposing free radical-forming agents or under the action of ionizing radiation (gamma radiation, X-radiation, accelerated electrons), is also known.

For the grafting of olefinic polymers in the presence of thermally decomposing free radical-forming agents in the solid phase, particulate olefinic polymers with ethylenically unsaturated monomers and thermally decomposing free radical-forming agents are mixed together in one or several steps, heated to a specified reaction temperature and reacted to form grafted copolymers (DE 41 23 972, DD 135 622, DD 131 752, DD 135 621).

The above-mentioned undesirable side reactions can also occur when grafting is carried out in the solid phase. In the U.S. Pat. No. 4,595,726, reference is made to the simultaneously occurring degradation of polypropylene, which becomes noticeable due to the increase in the melt index. Homopolymerization of the ethylenically unsaturated monomers used is another side phenomenon. Homopolymers can also be formed at the surface of the polymer particles that are to be grafted and cause agglomeration of the solid particles, as a result of which the flowability is adversely affected. As a consequence, the polymer bakes to the reactor wall and forms undesirable agglomerates. A further disadvantage consists therein that the grafting of the ethylenically unsaturated monomers does not take place uniformly over the cross section of the particles.

For the grafting of olefinic polymers under the action of ionizing radiation in the solid phase, vinyl monomers, such as styrene, butyl methacrylate, butyl acrylate and benzyl methacrylate were grafted according to EP 437 808 on polyolefins, including polypropylene, according to the "pre-irradiation method", polyolefin powder or polyolefin granulates being subjected at 10° to 85° C. to a pre-irradiation under inert conditions at radiation doses of 1 to 12 Mrd. Subsequently, grafting was accomplished by contacting with the liquid monomer or with the monomer solution at 10° to 50° C.

For the pre-irradiation method, polymer radicals are formed in the total volume of the polymer particles. These polymer radicals form the starting point for the subsequent grafting of the ethylenically unsaturated monomers. The method is used to improve the adhesion properties and dyeability of olefinic polymers and to achieve ion-exchange properties in these polymers.

According to EP 437 808, polymer degradation is prevented by excluding oxygen during the irradiation of olefinic polymers. However, only very reactive ethylenically unsaturated monomers such as styrene or acrylates, can be grafted in good yield by the pre-irradiation method.

Less reactive ethylenically unsaturated monomers, such as vinylsilanes, cannot be grafted by the pre-irradiation method.

DT 135 499 describes the grafting of olefinic polymers, including polypropylene in a fluidized bed by the pre-irradiation method and by the simultaneous irradiation method (pre-absorption). In the case of polypropylene, there was only surface grafting when vinylsilanes were used, the degree of grafting being too low to achieve wettability of the polypropylene by moisture.

DE 24 39 514 discloses the production of cross-linkable polyethylene high-voltage cables by the pre-absorption of vinylsilane in polyethylene in a special mixer and the continuous irradiation of the cable at room temperature. Under these conditions, the degradation of the polyethylene by irradiation was low.

It is an object of the present invention to develop cross-linkable olefinic polymers, which avoid the described disadvantages of known cross-linkable olefinic polymers, such as inhomogeneities and undesirable by-products in the modified product, which generally become noticeable during use, as well as to develop methods for their synthesis.

SUMMARY OF THE INVENTION

This objective was accomplished by cross-linkable olefinic polymers of olefinic polymers, ethylenically unsaturated organosilane compounds, further additives and optionally additional ethylenically unsaturated monomers, saturated organosilane compounds and diluents. The inventive, cross-linkable olefinic polymers are synthesized by a method, for which mixtures of a) 100 parts by weight of olefinic polymers
b) 0.05 to 10 parts by weight of ethylenically unsaturated organosilane compounds, preferably organosilane compounds having the formula $XY_{3-n}SiR_n$, in which X is an ethylenically unsaturated group, which can be grafted, Y is an alkyl and/or aryl group and R is a $C_1$ to $C_8$ alkoxy and/or carboxy group and/or halogen, and n represents the numbers 1, 2 or 3,
c) 0 to 10 parts by weight of additional, ethylenically unsaturated monomers,
d) 0 to 10 parts by weight of saturated organosilane compounds, preferably organosilane compounds having the formula $Z_{4-n}SiR_n$, in which Z represents an epoxyalkyl, glycidoxyalkyl, mercaptoalkyl, aminoalkyl and/or isocyanatoalkyl group and R represents a $C_1$ to $C_8$ alkoxy and/or acetoxy group and/or halogen and n represents the numbers 1, 2 and 3,
e) 0.01 to 45 parts by weight of further additives A) with addition of 0.01 to 5% by weight, based on the olefinic polymers used, of acyl peroxides, alkyl peroxides, hydroperoxides, ketone peroxides, peresters, peroxydicarbonates, peroxyketals, azo compounds and/or azonitriles as thermally decomposing free radical-forming agents under inert conditions are heated in a first step to a temperature $T_1$, which is 30° to 110° C. below the softening temperature or the crystallite melting point of the polymers used and, in a second step, to a reaction temperature $T_2 > T_1$, which is 10° to 60° C. below the softening temperature or the crystallite melting point of the polymers used, or B) with addition of 0 to 40% by weight of inert diluents, are subjected to an ionizing radiation at radiation doses ranging from 0.01 to 1.0 Mrd and to temperatures ranging from 5° to 110° C. below the softening temperature or the crystallite melting point of the polymers used, the process conditions for the synthesis of the cross-linkable olefinic polymers advisably being adjusted according to the equation $$M = K(T_{ME} + 80 - T_P/T_{ME} - T_P) \times \log(1 + 5.2D) \times 100$$

M is the proportion by weight of grafted, ethylenically unsaturated organosilane compounds or of grafted, ethylenically unsaturated organosilane compounds and additional ethylenically unsaturated compounds (in % by weight), K is an empirical factor, which is determined by the type of ethylenically unsaturated compounds and their absorption kinetics, $T_{ME}$ is the softening temperature or the crystallite melting point of the polymers used $T_P$ is the process temperature (in ° C.) and D is the dose of ionizing radiation absorbed (in Mrd).

For propylene polymers ($T_{ME}$=approx. 160° C.), the above equation simplifies to $$M = K(240 - T/160 - T) \times \log(1 + 5.2D) \times 100$$

M is the proportion by weight of grafted, ethylenically unsaturated organosilane compounds or of grafted, ethylenically unsaturated organosilane compounds and additonal ethylenically unsaturated compounds (in % by weight), K is an empirical factor, which is determined by the type of ethylenically unsaturated compounds and their absorption kinetics, T is the process temperature (in ° C.) and D is the dose of ionizing radiation absorbed (in Mrd).

For example, the empirical factor K is 1.6 for vinyltrimethoxysilane and 5.9 for vinyltriethoxysilane.

As olefinic polymers, all polymers are suitable, which are synthesized by polymerization of monomers containing one or more double bonds. Preferred as olefinic polymers are homopolymers and/or copolymers of α-olefins with 2 to 18 carbon atoms, particularly linear and/or branched polyethylene homopolymers and/or copolymers, cycloolefin-ethylene copolymers, polypropylene homopolymers, random propylene copolymers, propylene block copolymers, random propylene block copolymers, elastomeric polypropylenes, isotactic poly-1-butene and/or 4-methyl-1-pentene homopolymers and/or copolymers, the average particle size of the olefinic polymers, existing as powders, granulates and/or grits, being 0.001 to 7 mm and preferably 0.05 to 4 mm.

The ethylenically unsaturated organosilane compounds preferably are:

acryloxyalkylsilanes, such as acryloxypropyltrimethoxysilane, acryloxypropyldimethylethoxysilane, acryloxypropylmethyidiethoxysilane, acryloxypropyltriethoxysilane, acryloxypropyltrismethoxyethoxysilane, trimethylsiloxyethyl acrylate, acryloxypropyidimethylchlorosilane and/or acryloxypropyltrichlorosilane, alkenylalkoxysilanes, such as allyltriethoxysilane, allyltrimethoxysilane, octenyltrimethoxysilane, propenyltriethoxysilane and/or propenyltrimethoxysilane, alkenylhalogensilanes such as allyldimethyidichlorosilane, allyidimethylchlorosilane, hexenyldimethylchlorosilane, methylcyclohexenylethyldichlorosilane, allyltrichlorosilane, hexenyltrichlorosilane, octenyltrichlorosilane, propenyltrichlorosilane and/or tetradecenyltrichlorosilane, aminoalkenylsilanes such as aminobutenyltriethoxysilane and/or aminoethylallyldimethoxysilane, aminovinylsilanes such as aminoethyldiethoxyvinylsilane, aminoethyidimethoxyvinylsilane and/or aminophenylvinyltrimethoxysilane, cycloalkenylsilanes such as cyclohexenyltriethoxysilane, triethoxylsilylbicycloheptene, cyclohexenylethyltrimethoxysilane, cyclohexenylethyidimethylchlorosilane, trichlorosilylethylcyclohexene and/or cyclohexenyltrichlorosilane, methacryloxyalkylsilanes such as methacryloxypropyltrimethoxysilane, methacryloxypropyldimethylethoxysilane, methacryloxypropylmethyidiethoxysilane, methacryloxypropyltriethoxysilane, methacryloxypropyltrismethoxyethoxysilane, trimethylsiloxyethylmethacrylate, methacryloxypropyidimethychlorosilane and/or methacryloxypropyltrichlorosilane, vinylalkoxysilanes such as vinyltributoxysilane, vinyltriethoxysilane, vinyltriisopropoxysilane, vinyltlimethoxysilane, vinyltrismethoxyethoxysilane, vinyltristrimethoxysilane, vinyldimethylethoxysilane, vinyldimethylmethoxysilane, vinylethyldiethoxysilane, vinylmethyidiethoxysilane, phenylvinyltlimethoxysilane, diphenylvinylethoxysilane, vinylphenyidiethoxysilane, vinylphenyidimethoxysilane and/or vinylphenylmethylmethoxysilane, vinylhalogensilanes such as vinylethyidichlorosilane, vinylmethyldichlorosilane, diphenylvinylchlorosilane, phenylvinyldichlorosilane, vinyidimethylchlorosilane and /or vinyltfichlorosilane, vinylcarboxysilanes such vinylmethyidiacetoxysilane and/or vinyltriacetoxysilane, mixture of these ethylenically unsaturated organosilane compounds.

As additional ethylenically unsaturated monomers, the following are preferred:

monovinyl compounds suchasdiethyleneglycol monovinyl ether, ethyl vinyl acetate, ethyl vinyl ether, ethyl vinyl pyridine, methyl vinyl acetate, methyl vinyl ether, methyl vinyl pyridine, vinyl acetate, vinylacetoxy methyl ketone, vinyl adipate, vinyl butyl ether, vinyl butyl ketone, vinyl butyrate, vinyl carbazole, vinyl cyanoacetate, vinyl dodecyl ether, vinyl ether, vinyl ethyl ether, vinyl ethylene glycol glycidyl ether, vinyl ethylhexyl ether, vinyl ethyl ketone, vinyl format, vinyl furan, vinyl hexyl ether, vinyl imidazole, vinyl isobutyl ether, vinyl isocyanate, vinyl isopropyl ether, vinyl isopropyl ketone, vinyl laurate, vinyl methyl ether, vinyl methyl ketone, vinyl octadecyl ether, vinyl octyl ether, N-vinyloxazolidone, vinyl pelargonate, 5-vinylpicoline, vinyl propionate, N-vinylpyridine, N-vinylpyrrolidone and /or vinyl stearate;

divinyl compounds such as diethylene glycol divinyl ether, divinyl pentane and/or divinyl propane;

allyl compounds, such as allyl acetate, allyl alcohol, 3-allyl-1-butene, allyl butyl ether, allyl cyanurate, allyl cyclohexane, allyl diethyl ketone, allyl epoxypropyl ether, allyl ethyl ether, allyl glycidyl ether, allyl heptanoate, allyl hexanoate, allyl methacrylate, allyl methyl ether, allyl methyl maleate, allyloxy-2,3-propylene glycol, N-allyl stearamide and/or allyl vinyl ether;

methacrylic acid and derivatives of methacrylic acid,, such as methacrylamide, methacrylonitrile, benzyl methacrylate, butyl methacrylate, cyclohexyl methacrylate, N,N-dimethylmethacrylamide, dodecyl methacrylate, ethyl methacrylate, 2-ethylhexyl methacrylate, 2-ethoxyethyl methacrylate, glycidyl methacrylate, hydroxyethyl methacrylate, isopropyl methacrylate, 2-methoxyethyl methacrylate, 4-methoxybenzyl methacrylate, methyl methacrylate, sodium methacrylate, N-t-butoxycarbonyl-2-aminoethyl methacrylate, octyl methacrylate, n-propyl methacrylate and/or tetrahydrofurfuryl methacrylate;

unsaturated dicarboxylic acid anydrides, such as citraconic anhydride, fumaric anhydride, itaconic anhydride and/or maleic anhydride;

dienes such as, butadiene, butadiene-1-carboxylic acid, chloroprene, 1,3-cyclohexadiene, 1,5-cyclohexadiene, cyclopentadiene, 2,3-dimethylbutadiene, 1-ethoxybutadiene, 1,4-heptadiene, 1,4-hexadiene, 1,6-hexadiene, isoprene, norbornadiene and/or 1,4-pentadiene;

mixtures of these additional, ethylenically unsaturated monomers.

Preferred examples of saturated organosilane compounds are epoxyalkylsilanes, glycidoxyalkylsilanes, aminoalkylsilanes, ureidoalkylsilanes and/or isocyanatoalkylsilanes, particularly glycidoxypropyltrimethoxysilane and/or glycidoxypropyltriethoxysilane.

Further additives preferably are 0.01 to 2.5 parts by weight of stabilizers, 0.1 to 1 part by weight of antistatic agents, 0.2 to 3 parts by weight of pigments, 0.05 to 1 part by weight of nucleating agents, 5 to 40 parts by weight of fillers and/or reinforcing materials, 5 to 20 parts by weight of elasticizing additives, 2 to 20 parts by weight of flame retardants, 0.5 to 10 parts by weight of solvent and/or 0.01 to 1 part by weight, in each case based on the olefinic polymers, of processing aids.

The stabilizers preferably are mixtures of 0.01 to 0.6% by weight of phenolic antioxidants, 0.01 to 0.6% by weight of processing stabilizers based on phosphites, 0.01 to 0.6% by weight of high temperature stabilizers based on disulfides and thioethers and 0.01 to 0.8% by weight of sterically hindered amines (HALS).

Suitable phenolic antioxidants are 2-t-butyl-2,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis (6-t-butyl-4-methylphenol), 4,4'-thio-bis-(6-t-butyl-2-methylphenol), octadecyl 3(3,5-di-t-butyl-4-hydroxyphenyl)-propionate, 1,3,5-trimethyl-2,4,6,-tris-(3', 5'-di-t-butyl-4-hydroxybenzyl)benzene and/or pentaerythritol tetrakis(3-(3,5-di-t-butyl-4-hydroxyphenyl)) propionate.

As HALS compounds, bis-2,2,6,6-tetramethyl-4-piperidyl sebacate and/or poly-(1,1,3,3-tetramethylbutyl)-imino)-1,3,5-triazine-2,4-diyl)(2,2,6,6-tetramethylpiperidyl)-amino)-hexamethylene-4-(2,2,6,6-tetramethyl)piperidyl)imino are particularly suitable.

Preferred processing aids are calcium stearate, magnesium stearate and/or waxes.

As elasticizing additives, oligosiloxanes with terminal siloxane groups, thermoplastic polyurethanes, polyoxyethylenes, polyoxypropylenes or mixtures of these polymers are suitable.

Suitable fillers and/or reinforcing agents are talcum, chalk, mica, wollastonite, glass fibers, carbon fibers, aramide fibers, ceramic fibers, other synthetic fibers or cellulose fibers.

DETAILED DESCRIPTION OF THE INVENTION

Pursuant to the invention, the cross-linkable olefinic polymers from unsaturated olefinic polymers, ethylenically unsaturated organosilane compounds, other additives and, optionally, other ethylenically unsaturated monomers, saturated organosilane compounds and diluents are synthesized by a method for which mixtures of
a) 100 parts by weight of olefinic polymers
b) 0.05 to 10 parts by weight of ethylenically unsaturated organosilane compounds, preferably organosilane compounds having the formula $XY_{3-n}SiR_n$, in which X is an ethylenically unsaturated group, which can be grafted, Y is an alkyl and/or aryl group and R is a $C_1$ to $C_8$ alkoxy and/or carboxy group and/or halogen, and n represents the numbers 1, 2 or 3,
c) 0 to 10 parts by weight of additional, ethylenically unsaturated monomers,
d) 0 to 10 parts by weight of saturated organosilane compounds, preferably organosilane compounds having the formula $Z_{4-n}SiR_n$, in which Z represents an epoxyalkyl, glycidoxyalkyl, mercaptoalkyl, aminoalkyl and/or isocyanatoalkalyl group and R represents a $C_1$ to $C_8$ alkoxy and/or acetoxy group and/or halogen and n represents the numbers 1, 2 and 3,
e) 0.01 to 45 parts by weight of further additives
with addition of 0.01 to 5% by weight, based on the olefinic polymers used, of acyl peroxides, alkyl peroxides, hydroperoxides, ketone peroxides, peresters, peroxydicarbonates, peroxyketals, azo compounds and/or azonitriles as thermally decomposing free radical-forming agents under inert conditions are heated in a first step to a temperature T., which is 30° to 110° C. and preferably 10° to 25° below the softening temperature or the crystallite melting point of the polymers used for which, at a residence time of 1 to 240 minutes and preferably of 20 to 50 minutes, less than 5% by weight of the thermally decomposing free radical-forming agent may decompose and for which the mixtures are heated in a second step to a reaction temperature $T_2 > T_1$, which is 10° to 60° C. and preferably 5° to 18° C. below the softening temperature or the crystallite melting point of the polymers used and for which the half life of the decomposition of the thermally decomposing free radical-forming agent used is not more than 60 minutes and the reaction time is at least 6 half lives of the decomposition of the thermally decomposing free radical-forming agent used.

The olefinic polymers are used in the solid phase as particles and exist preferably as powders, granulates or grits. The preferred particle size ranges from 0.001 to 7 mm and especially from 0.05 to 4 mm. It has proven to be advantageous to modify the polyolefin particles directly as they come from the polymerization plant.

In a special variation of the method, aminosilanes are used as saturated organosilane compounds and anhydrides of unsaturated carboxylic acids are used as further ethylenically unsaturated monomers. Preferably, the two components are used in a molar ratio of 1:1.

To improve the dispersability of the reaction components to achieve swelling of the olefinic polymers, 0.5 to 10 parts by weight of organic solvents can be added to the mixture as further additives acting as solvent for the monomers and free radical-forming agents and as a swelling agent for the olefinic polymers. Suitable solvents or swelling agents preferably are toluene, chlorobenzene, acetone, methanol, ethanol, methyl ethyl ketone, ether and/or dioxane.

The thermally decomposing free radical-forming agents, used for the inventive method, are:
acyl peroxides, such as acetyl benzoyl peroxide, benzoyl peroxide, 4-chlorobenzoyl peroxide, dinitrobenzoyl peroxide, 3-methoxybenzoyl peroxide and/or methyl benzoyl peroxide:
alkyl peroxides such as allyl-t-butyl peroxide, 2,2-bis-(t-butylperoxybutane), 1,1-bis-(t-butylperoxy-)-3,3,5-trimethylcyclohexane, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amyl peroxy)-cyclohexane, t-amyl peroxide, t-butylcumyl peroxide, t-butyl peroxide and/or 1-hydroxy-butyl-n-butyl peroxide
hydroperoxides such as decalin hydroperoxide and/or tetralin hydroperoxide;
ketone peroxides such as methy ethyl ketone hydroperoxide;
peroxy ketals such as 1,1-di-t-butylperoxy-3,3,5-trimethylcyclohexane;
peresters and peroxycarbonates such as butyl peracetate, cumyl peracetate, cumyl perpropionate, cyclohexyl peracetate, di-t-butyl peradipate, di-t-butyl perazelate, di-t-butyl perglutarate, di-t-butyl perphthalate, di-t-butyl persebacate, 4-nitrocumyl perpropionate, 1-phenylethyl perbenzoate phenylethyinitro perbenzoate, t-butyl bicyclo-(2,2,1)heptane percarboxylate, t-butyl-4-carbomethoxy perbutyrate, t-butycyclobutane percarboxylate, t-butylcyclohexyl peroxycarboxylate, t-butyl-cyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butyl perbenzoate, t-butylcarboxycyclohexane, t-butyl pernaphthoate, t-butylperoxyisopropyl carbonate, t-butyl pertoluate, t-butyl-1-phenylcyclopropyl percarboxylate, t-butyl-2-propyl perpentenoate, t-butyl-1-methylcypropyl percarboxylate, t-butyl-4-nitrophenyl peracetate, t-butylnitrophenyl peroxycarbamate, t-butyl-N-succinimido percarboxylate, t-butyl percrotonoate, t-butyl peimaleic acid, t-butyl permethacrylate, t-buty peroctoate, t-butylperoxy isopropylcarbonate, t-butyl perisobutyrate, t-butyl peracrylate and/or t-butyl perpropionate;

azonitriles such as 2-cyano-2-propylazoformamide, 2,2'-azo-bis-2-methyl propionitrile, 1,1'-azo-bis-cyclopentane nitrile, 1,1'-azo-bis-cyclohexane nitrile and/or 2,2'-azo-bis-cyclohexyl propionitlile;

azo compounds, such as 2,2'-azo-bis-methyl-2-methyl propionate, azo-bis-(N,N'-diethyleneisobutyramidine), 1,1'-azo-bis-1-phenylethane and/or 1,1'-azo-bis-1-phenylpropane;

mixtures of these free radical-forming agents.

The inert conditions are achieved through the use of inert gases, such as nitrogen or argon, during the reaction.

Depending on the process conditions selected, the heating at the first temperature step takes place for 1 to 240 minutes and preferably for 20 to 50 minutes and, at a second temperature step, for at least 6 half lives of the decomposition of the thermally decomposing free radical-forming agent used which, depending on the decomposition characteristics of the free radical-forming agent used, correspond to 5 to 180 minutes, preferably 10 to 90 minutes and particularly 30 to 60 minutes.

Appropriate reaction temperatures for $T_1$ and $T_2$ are, respectively, 30° to 50° C. and 10° to 30° C. below the softening temperature or the crystallite melting point.

Pursuant to the invention, a further method for producing cross-linkable olefinic polymers from olefinic polymers, ethylenically unsaturated organosilane compounds, other additives and, optionally, other ethylenically unsaturated monomers, saturated organosilane compounds and diluents consist therein that mixtures of a) 100 parts by weight of olefinic polymers
b) 0.05 to 10 parts by weight of ethylenically unsaturated organosilane compounds, preferably organosilane compounds having the formula $XY_{3-n}SiR_n$, in which X is an ethylenically unsaturated group which can be grafted, Y is an alkyl and/or aryl group and R is a $C_1$ to $C_8$ alkoxy and/or carboxy group and/or halogen, and n represents the numbers 1, 2 or 3,
c) 0 to 10 parts by weight of additional, ethylenically unsaturated monomers,
d) 0 to 10 parts by weight of saturated organosilane compounds, preferably organosilane compounds having the formula $Z_{4-n}SiR_n$, in which Z represents an epoxyalkyl, glycidoxyalkyl, mercaptoalkyl, aminoalkyl and/or isocyanatoalkalyl group and R represents a $C_1$ to $C_8$ alkoxy and/or acetoxy group and/or halogen and n represents the numbers 1, 2 and 3,
e) 0.01 to 45 parts by weight of further additives with addition of 0 to 40% by weight of inert diluents, are subjected to an ionizing radiation, which is applied preferably by radiation equipment containing sources of nuclide radiation or by electron accelerators, at radiation doses ranging from 0.01 to 1.0 Mrd and preferably from 0.01 to 0.25 Mrd and at temperatures ranging from 5° to 110° C. and preferably from 20° to 80° C. below the softening temperature or the crystallite melting point of the polymers used, the process conditions for the synthesis of the cross-linkable olefinic polymers being adjusted according to the equation $$M=K(T_{ME}+80-T_P/T_{ME}-T_P)\times\log(1+5.2D)\times 100$$

M is the proportion by weight of grafted, ethylenically unsaturated organosilane compounds or of grafted, ethylenically unsaturated organosilane compounds and further ethylenically unsaturated compounds (in % by weight), K is an empirical factor, which is determined by the type of ethylenically unsaturated compounds and their absorption kinetics, $T_{ME}$ is the softening temperature or the crystallite melting point of the polymers used $T_P$ is the process temperature (in ° C.) and D is the dose of ionizing radiation absorbed (in Mrd).

To improve the dispensability of the reaction components, inert diluents, such as saturated hydrocarbons, acetone, methanol, ethanol, methyl ethyl ketone, ether and/or dioxane can be added to the mixture as further additives.

For applying the ionizing radiation, nuclide irradiation equipment with cobalt 60 or cesium 137 is suitable as a radiation source. For high production throughputs, the use of electron accelerators is advantageous for applying the ionizing radiation. At high production throughputs, the use of electron accelerators for applying the ionizing radiation is advantageous. Suitable for this purpose are electron accelerators of the Cockroft-Walton type with energies ranging from 300 to 4,500 KeV, as well as linear accelerators with energies ranging from 1,000 to 10,000 KeV.

Particularly advantageous is a continuous process, for which the oxygen-free finely particulate olefinic polymer passes directly from the polyolefin synthesis station continuously, pursuant to the inventive method, through the modifying station with simultaneous absorption and irradiation.

A preferred variation of the inventive method for synthesizing cross-linkable olefinic polymers using ionizing radiation consists therein that propylene polymers are used as olefinic polymers, the ionizing irradiation is carried out at temperatures of 200 to 155° C., and preferably 80° to 140° C., and the process conditions for synthesizing the cross-linkable polypropylenes are adjusted according to the equation $$M=K(240-T/160-T)\times\log(1+5.2D)\times 100$$

M is the proportion by weight of grafted, ethylenically unsaturated organosilane compounds or of grafted, ethylenically unsaturated organosilane compounds and further ethylenically unsaturated compounds (in % by weight), K is an empirical factor, which is determined by the type of ethylenically unsaturated compounds and their absorption kinetics, T is the process temperature (in ° C.) and D is the dose of ionizing radiation absorbed (in Mrd).

Irradiation temperatures lower than 80° C. for the inventive method when propylene polymers are used lead to a lower grafting yield. Surprisingly, it has been observed that the ethylenically unsaturated organosilane compounds have a stabilizing effect on the radiation-induced chemical degradation of propylene polymers, so that it is possible to do without the addition of special stabilizers. As a result, high grafting yields are attained at low radiation doses without breakdown of the polypropylene. A slight breakdown of the polypropylene chains can be detected at radiation doses greater than 0.25 Mrd. It was not possible to detect the formation of homopolymers based on the ethylenically unsaturated organosilane compounds.

For the method involving the addition of thermally decomposing free radical-forming agents as well as for the method involving the action of ionizing radiation for producing free radicals for the synthesis of cross-linkable, olefinic polymers, the absorption of the ethylenically unsaturated organosilane compounds and optionally of other ethylenically unsaturated monomers and saturated organosilane compounds by the olefinic polymers and the reaction of these absorbed reactants with the olefinic polymers are preferably carried out at pressures of 0.01 to 1 MPa and especially at pressures of 0.05 to 0.5 MPa.

The cross-linkable, silane-grafted olefinic polymers, synthesized by the two variations of the inventive method, exist as flowable, not agglomerated polymer particles, which can be discharged without problems from the reaction vessel and do not show any significant changes in color and melt index.

The inventive, cross-linkable olefinic polymers can be cross linked by conventional, thermoplastic processing methods, optionally with addition of silanol condensation catalysts, such as dibutyl tin dilaurate or dibutyl tin diacetate, into cross-linkable semi-finished products and molding materials and cross-linked by contact with hydrogen or water vapor.

The cross-linkable olefinic polymers, as well as mixtures with unmodified olefinic polymers, are suitable preferably for the production of films, sheets, fibers, panels, coatings, pipes, hollow objects, foam materials and/or molded parts. These semi-finished products and molding materials are used particularly for applications for which increased chemical resistance and thermal shock resistance are required.

The invention will be described by the following examples:

Example 1

In a stirred stainless steel vessel, which can be closed off and has a heating mantle and facilities for flushing with nitrogen, 100 parts by weight of polypropylene homopolymer powder, having an average particle diameter of 0.4 mm and a melt index of 2.86 g/10 minutes (at 230° C. and 2.16 kg, corresponding to DIN 53735) were heated with stirring in a nitrogen atmosphere to the reaction temperature of 110° and then treated with the liquid mixture consisting of 1.5 parts by weight of vinyl trimethoxysilane (VTMOS) and 1.0 parts by weight of t-butylperoxy 2-ethylhexanoate (TBPEH) with intensive mixing of the powder bed. The reactor was closed and the reaction mixture was tempered for two hours with stirring and then cooled to room temperature. Thereupon, the stabilizers tetrakis(methylene-(3,5-di-t-butylhydroxyhydrocinnamate)) methane (0.2 parts by weight), Ionol (0.4 parts by weight) and tris(2,4-di-t-butylphenyl) phosphite (0.2 parts by weight) were added in a mixer. After vacuum-drying for 12 hours at 75° C. for removing monomer that had not been grafted, the melt index was measured and the silane content determined by IR spectroscopy.

The analytic data for the grafted copolymers of examples 1 to 8 is summarized in Table 1.

Example 2

The materials and quantities used correspond to those of Example 1. Polypropylene homopolymer powder is added to the stirred stainless steel vessel and the reactor is flushed with nitrogen. While the powder bed is being stirred, the liquid mixture is metered into the reactor. After being stirred for 30 minutes at a temperature of 50° C., the charged powder is heated to a temperature of 110° C. and the experiment is continued as in Example 1.

Example 3

The materials used are similar to those used in Example 1; however, the quantities are changed. A liquid mixture, consisting of 3.5 parts by weight of VTMOS and 1.0 parts by weight of TBPEH, is added to 100 parts by weight of polypropylene homopolymer powder. The experiment is carried out as in Example 2.

Example 4

The materials and amounts used are identical to those in Example 3; in addition a solvent is used. The liquid mixture contains 3.5 parts by weight of VTMOS, 1.0 parts by weight of TBPEH and 4.5 parts by weight of acetone. The experiment is carried out as in Example 2.

Example 5

The experiment is carried out as described in Example 2. Instead of the propylene homopolymer, a random copolymer of 6 mole % ethylene and 94 mole % propylene, having a melt index of 1.25 g/10 minutes, is used for the grafting. The liquid mixture consists of 1.5 parts by weight of VTMOS, 1.0 parts by weight of TBPEH and 4.5 parts by weight of acetone.

Example 6

The experiment is carried out as described in Example 2, the analogous molar amount of methacrylisopropyltrimethoxysilane (MATMOS) is used, that is a liquid mixture, consisting of 2.51 parts by weight of MATMOS, 1.0 parts by weight of TBPEH and 4.5 parts by weight of acetone, is added to 100 parts by weight of polypropylene homopolymer powder.

Example 7

The experiment is carried out as described in Example 2. Instead of VTMOS alone, a monomer mixture of VTMOS, γ-aminopropyltrimethoxysilane (APTMOS) and maleic anhydride (MSA) is used for the grafting. A liquid mixture consisting of 0.82 parts by weight of VTMOS, 0.82 parts by weight of APTMOS, 0.45 parts by weight of MSA, 1.0 parts by weight of TBPEH and 4.5 parts by weight of acetone is added to 100 parts by weight of polypropylene homopolymer powder.

Example 8

In a stirred stainless steel vessel, which can be closed off and has a heating mantle and facilities for flushing with nitrogen, 100 parts by weight of polyethylene HD homopolymer powder, having an average particle diameter of 0.25 mm and a melt index of 1.2 g/10 minutes (at 190° C. and 5 kg, corresponding to DIN 53735) were placed under a blanket of nitrogen. While stirring a liquid mixture, consisting of 1.5 parts by weight of vinyltrimethoxysilane (VTMOS) and 1.0 parts by weight of t-butylperoxy 2-ethylhexanoate (TBPEH), is added to the powder bed and the mixture, after intensive mixing for 50 minutes at 40° C., is heated with stirring to the reaction temperature of 90° C., maintained at this temperature with stirring for 6 hours and then cooled to room temperature. Thereupon, the stabilizers tetrakis(methylene-(3,5-di-t-butylhydroxyhydrocinnamate)) methane (0.2 parts by weight), Ionol (0.4 parts by weight) and tris(2,4-di-t-butylphenyl) phosphite (0.2 parts by weight) were added in a mixer. After vacuum-drying for 12 hours at 65° C. for removing monomer that had not been grafted, the melt index was measured and the silane content determined by IR spectroscopy.

TABLE 1

Analytical Data for the Graft Copolymers of Examples 1 to 8

| Experiment | Melt Index at 230° C. and 2.16 kg (g/10 minutes) | Degree of Grafting (%) | Grafting Yield (%) |
|---|---|---|---|
| Example 1 | 5.1 | 0.9 | 60 |
| Example 2 | 7.8 | 1.33 | 89 |
| Example 3 | 5.8 | 1.33 | 89 |
| Example 4 | 9.4 | 2.55 | 73 |
| Example 5 | 3.2 | 1.31 | 87 |
| Example 6 | 7.6 | 2.4 | 96 |
| Example 7 | 7.9 | 1.1 | 87 |
| Example 8 | 0.65* | 1.2 | 81 |

*MFI at 190° C./5 kg

Example 9

An unstabilized polypropylene powder (200 gram, having a particle diameter of 50 to 250 μm, a specific surface area of 4×10⁻² m²/g, a melt index of 0.5 g/10 minutes at 230° C. and 2.16 kg) is transferred to a glass reactor that is provided with a heating mantle. After the heating is switched on, the glass reactor is evacuated to a vacuum of 10⁻¹ mm Hg. Subsequently, 10.5 mL (9.5 g) of vinyltriethoxysilane (VTEOS; K factor=5.9) is injected into the reactor. According to the process equation, the amount of VTEOS injected is 10 to 15% above the amount required for grafting.

The glass reactor, heated to 130° C., is brought into the radiation chamber of the laboratory irradiation installation RCH-γ-30 and irradiated at the rate of 0.4 Mrd/hour. After an irradiation time of 15 minutes, the gamma radiation absorbed amounts to 0.1 Mrd. When the absorbed dose is attained, the reactor is removed from the irradiation zone and cooled to room temperature and the VTEOS-grafted polypropylene is dried for one hour under vacuum at 140° C. in order to remove traces of unreacted monomer.

The amount of VTEOS grafted was determined by Fourier IR analysis with an accuracy of ±0.1% and amounted to 4.3%. The melt index of the modified polypropylene was 0.7 g/10 minutes at 230° C. and 2.16 kg.

To determine the proportion of gel attainable by hydrolysis a 100 μm film was produced by compressing the modified product at 180° c. and 8.0 MPa and hydrolyzed for 20 to 30 hours at 80° C. with the addition of 2% to 5% by weight of dibutyl tin dilaurate as silanol condensation catalyst. The gel portion, determined by extraction with boiling xylene, was 73.2% by weight.

Example 10

Polypropylene of Example 9 (200 g) is transferred to a glass reactor equipped with a heating mantle. After the heating is switched on, the glass reactor is evacuated to a vacuum of 10⁻¹ mm Hg and subsequently 5 g of VTEOS (K factor=5.9) are injected into the reactor. The amount of VTEOS injected is 10% to 15% above the amount required for grafting according to the process equation.

The glass reactor, heated to 80° C., is brought into the irradiation chamber of the laboratory irradiation installation RCH-γ-30 and irradiated at the rate of 0.4 Mrd/hour. After an irradiation time of 15 minutes, the gamma radiation absorbed amounts to 0.1 Mrd. When the absorbed dose is attained, the reactor is removed from the irradiation zone and cooled to room temperature and the VTEOS-grafted polypropylene is dried for one hour under vacuum at 140° C. in order to remove traces of unreacted monomer. The proportion of grafted VTEOS was 2.3% and the melt index of the modified polypropylene was 0.6 g/10 minutes at 230° C. and 2.16 kg. A gel portion of 88.3% was attained by hydrolytic condensation.

Example 11

Polypropylene of Example 9 (200 g) is transferred to a glass reactor that is provided with a heating mantle. After the heating is switched on, the glass reactor is evacuated to 10⁻¹ mm Hg and subsequently 5.2 g of VTMOS (K factor=1.6) are injected into the reactor. The amount of VTMOS injected is 10% to 15% above the amount required for grafting according to the process equation.

The glass reactor, heated to 130° C., is brought into the irradiation chamber of the laboratory irradiation installation RCH-γ-30 and irradiated at the rate of 0.4 Mrd/hour. After an irradiation time of 37.5 minutes, the gamma radiation dose absorbed amounts to 0.25 Mrd. When the absorbed dose is attained, the reactor is removed from the irradiation zone and cooled to room temperature and the VTMOS-grafted polypropylene is dried for one hour under vacuum at 140° C. in order to remove traces of unreacted monomer. The proportion of grafted VTMOS was 2.4% and the melt index of the modified polypropylene was 1.3 g/10 minutes at 230° C. and 2.16 kg. A gel portion of 70.3% was attained by hydrolytic condensation.

Example 12 (Comparison Example)

Polypropylene of Example 9 (200 g) is stabilized with 0.4% Ionol and transferred to a glass reactor that is provided with a heating mantle. After the heating is turned on, the glass reactor is evacuated to 10⁻¹ mm Hg and subsequently 5 g of VTEOS (K factor=5.9) are injected into the reactor.

The glass reactor, heated to 80° C., is brought into the irradiation chamber of the laboratory irradiation installation RCH-γ-30 and irradiated at the rate of 0.4 Mrd/hour. After an irradiation time of 15 minutes, the gamma radiation absorbed amounts to 0.1 Mrd. When the absorbed dose is attained, the reactor is removed from the irradiation zone and cooled to room temperature and the VTEOS-grafted polypropylene is dried for one hour under vacuum at 140° C. in order to remove traces of unreacted monomer. The proportion of grafted VTEOS was 0.3% and the melt index of the modified polypropylene was 0.5 g/10 minutes at 230° C. and 2.16 kg. No detectable gel portion could be achieved by hydrolytic condensation.

Example 13

Polypropylene of Example 9 (200 g) is transferred to a glass reactor that is provided with a heating mantle. After the heating is switched on, the glass reactor is flushed repeatedly with argon and subsequently 9.5 g Of VTEOS (K factor 5.9) are injected into the reactor. The amount of VTEOS injected is 10% to 15% above the amount required for grafting according to the process equation. The glass reactor, heated to 130° C., is brought into the irradiation chamber of the laboratory irradiation installation RCH-γ-30 and irradiated at the rate of 0.4 Mrd/hour. After an irradiation time of 15 minutes, the gamma radiation absorbed amounts to 0.1 Mrd. When the absorbed dose is attained, the reactor is removed from the irradiation zone and cooled to room temperature and the VTEOS-grafted polypropylene is dried for one hour under vacuum at 140° C. in order to remove traces of unreacted monomer. The proportion of grafted VTEOS was 4.3% and the melt index of the modified polypropylene was 0.7 g/10 minutes at 230° C. and 2.16 kg. A gel portion of 73.2% was attained by hydrolytic condensation.

Example 14

A heatable stainless steel reactor, with a capacity of 12 L, is installed in a gamma irradiation installation of the "Gamnabeam" type. Polypropylene powder (1,850 g) of example 9 and 450 g of an unstabilized polyethylene powder (with a particle diameter of 80 to 240 mm, a density of 0.961 g/cc, a melt index of 29 g/10 minutes at 190° and 2.16 kg). After the heating is switched, the stainless steel reactor is flushed repeatedly with argon, after which 280 g of VTEOS (K factor=5.9) are metered into the reactor. The amount of VTEOS added is 10 to 15% above the amount required for the grafting according to the process equation. After the stainless steel reactor is heated to 130° C. and the radiation sources are positioned in the radiating position, the radiation is conducted at an output of 0.0125 Mrd per hour. After an irradiation time of 20 hours, 0.25 Mrd of gamma radiation are absorbed. After the radiation sources are lowered into the source container, the stainless reactor is cooled to room temperature and the VTEOS-grafted polypropylene is dried for 1 hour under vacuum at 140° C. in order to remove traces of unreacted monomer. The proportion of grafted VTEOS was 11.4%. A gel portion of 78% was attained by hydrolytic condensation.

Example 15

Polypropylene powder of Example 9 and a mixture of 65% by weight of VTMOS and 5% by weight of glycidoxypropyltrimethyoxysilane (GPTMOS) and 30% by weight of acetone are metered continuously at rates of 450 g per second and 5.8 g per second respectively into a 1.6 m³ cassette reactor with vibrator, which has been heated to 75° C. and into the narrow side faces of which the two beam-existing windows of the scanner of an electron accelerator of the Cockroft-Walton type (energy of 2500 KeV, 2×25 KW) are integrated. The modified polypropylene is discharged continuously and, with addition of 0.30% by weight of 2,6-di-t-butyl-4 -methoxymethylphenol, 0.15% by weight of bis-2,2,6,6-tetra-methyl-4-piperidyl sebacate and 4% by weight of dibutyl tin dilaurate, based on the modified polypropylene powder metered pneumatically into a Werner & Pfleiderer ZSK 120 twin screw extruder and homogenized and granulated at 180° C. to 240° C. and a residence time of 3.5 minutes. The proportion of grafted VTMOS was 0.7%. The hydrolytic condensation resulted in a gel portion of 41%.

What is claimed is:

1. A cross-linkable propylene polymer composition comprising a mixture of:
   a) about 100 parts by weight of a propylene polymer;
   b) about 0.05 to about 10 parts by weight of an ethylenically unsaturated organosilane compound;
   c) 0 to about 10 parts by weight of a second ethylenically unsaturated compound;
   d) 0 to about 10 parts by weight of a saturated organosilane compound;
   e) about 0.01 to 45 parts by weight of at least one additive; and
   f) about 0.01 to about 5% by weight, based on said propylene polymer used, of a free radical-forming agent,
   wherein said cross-linkable olefinic polymer composition is produced by a process of heating said mixture in a first step to a temperature $T_1$, which is about 30° to about 110° C. below the softening temperature or the crystallite melting point of said propylene polymer used and, in a second step, to a reaction temperature $T_2$ wherein $T_2$ is $>T_1$ and is about 10° to about 60° C. below the softening temperature or the crystallite melting point of said propylene polymer used.

2. A cross-linkable propylene polymer composition comprising a mixture of:
   a) about 100 parts by weight of an propylene polymer;
   b) about 0.05 to about 10 parts by weight of an ethylenically unsaturated organosilane compound;
   c) 0 to about 10 parts by weight of a second ethylenically unsaturated compound;
   d) 0 to about 10 parts by weight of a saturated organosilane compound; and
   e) 0 to about 40% by weight of at least one inert diluent,
   wherein said cross-linkable propylene polymer composition is produced by a process of subjecting said mixture to an ionizing radiation at radiation doses ranging from about 0.01 to about 1.0 Mrd and at temperatures ranging from about 50 to about 110° C. below the softening temperature of the crystallite melting point of said propylene polymer used.

3. The cross-linkable propylene polymer composition according to claim 1 or 2, wherein said ethylenically unsaturated organosilane compound is a compound selected from the group consisting of an acryloxylalkylsilane, an alkenylalkoxysilane, an alkenylhalogensilane, an aminoalkenylsilane, an aminovinylsilane, a cycloalkenylsilane, a methacryloxyalkylsilane, a vinylalkoxysilane, a vinylhalogensilane, and a vinylcarboxysilane.

4. The cross-linkable propylene polymer composition according to claim 1 or 2, wherein the second ethylenically unsaturated compound is a compound selected from the group consisting of a monovinyl compound, a divinyl compound, an allyl compound, acrylic acid, methacrylic acid, methacrylamide, methacrylonitrile, benzyl methacrylate, butyl methacrylate, cyclohexyl methacrylate, N,N-dimethylmethacrylamide, dodecyl methacrylate, ethyl methacrylate, 2-ethylhexyl methacrylate, 2-ethoxyethyl methacrylate, glycidyl methacrylate, hydroxyethyl methacrylate, isopropyl methacrylate, 2-methoxyethyl methacrylate, 4-methoxybenzyl methacrylate, methyl methacrylate, sodium methacrylate, N-t-butoxycarbonyl-2-aminoethyl methacrylate, octyl methacrylate, n-propyl methacrylate and tetrahydrofurfuryl methacrylate, an unsaturated dicarboxylic acid anhydride, and a diene.

5. The cross-linkable propylene polymer composition according to claim 1 wherein said at least one additive is selected from the group consisting of: about 0.01 to 2.5 parts by weight of a stabilizer, about 0.1 to 1 part by weight of an antistatic agent, about 0.2 to 3 parts by weight of a pigment, about 0.05 to 1 part by weight of a nucleating agent, about 5 to 40 parts by weight of a filler and/or a reinforcing agent, about 5 to 20 parts by weight of an elasticizing additive, about 2 to 20 parts by weight of a flame retardant, about 0.5 to 10 parts by weight of a solvent and about 0.01 to 1 part by weight of a processing aid, in each case based on said propylene polymer.

6. A method for synthesizing a cross-linkable propylene polymer composition comprising:
   1. a mixing step of mixing:
      a) about 100 parts by weight of a propylene polymer;

b) about 0.05 to about 10 parts by weight of a first ethylenically unsaturated organosilane compound;

c) 0 to about 10 parts by weight of a second ethylenically unsaturated compound;

d) 0 to about 10 parts by weight of a saturated organosilane compound;

e) about 0.01 to about 45 parts by weight of at least one additive; and f) about 0.01 to 5% by weight, based on the propylene polymer used, of a free radical-forming agent;

2. a first step of heating the mixture to a temperature $T_1$, which is about 30° to about 110° C. below the softening temperature or the crystallite melting point of the propylene polymer used; and 3. a second step of heating the mixture to a reaction temperature $T_2$ wherein T2 is>$T_1$ and is about 10° to about 60° C. below the softening temperature or the crystallite melting point of the polymer used, and for which the half life of the decomposition of the thermally decomposing free radical-forming agent used is not more than about 60 minutes and the reaction time is at least 6 half lives of the decomposition of the thermally decomposing free radical-forming agent used.

7. A method for synthesizing a cross-linkable olefinic polymer composition comprising:

1. a mixing step of mixing:
  a) about 100 parts by weight of an propylene polymer;
  b) about 0.05 to about 10 parts by weight of an ethylenically unsaturated organosilane compound;
  c) 0 to about 10 parts by weight of a second ethylenically unsaturated compound;
  d) 0 to about 10 parts by weight of a saturated organosilane compound; and
  e) 0 to about 40% by weight of at least one inert diluent; and 2. subjecting the mixture to an ionizing radiation at a radiation dose of about 0.01 to about 1.0 Mrd and at temperatures ranging from about 5° to about 110° C. below the softening temperature or the crystallite melting point of the polymer used.

8. The method according to claim 7, wherein:

the ionizing radiation is carried out at temperatures of about 20° to about 155° C.; and the process conditions for the synthesis of the cross-linkable polypropylene composition are adjusted according to the equation:

$$M=K(240-T/160-T)\times\log(1+5.2D)\times100$$

wherein M is the proportion by weight, in % by weight, of the grafted, ethylenically unsaturated organosilane compound or of grafted, ethylenically unsaturated organosilane compound and ethylenically unsaturated compound, K is an empirical factor, which is determined by the type of ethylenically unsaturated compound and its absorption kinetics, T is the process temperature, in ° C., and D is the dose of ionizing radiation absorbed, in Mrd.

9. The method according to claim 6 or 7, wherein the absorption of the reactants b), c) and d) by the propylene polymer a) and the reaction of the absorbed reactants b), c) and d) with the propylene polymer a) takes place at pressures of about 0.01 to about 1 MPa.

10. Films, sheets, fibers, panels, coatings, pipes, hollow objects, foamed materials or molded parts comprised of the product of cross linking a cross-linkable propylene polymer of claim 1 or 2 or a mixture thereof with at least one unmodified olefinic polymer.

11. The cross-linkable propylene polymer composition of claim 1 or 2, wherein said ethylenically unsaturated organosilane compound is an organosilane compound having the formula $XY_{3-n}SiR_n$, in which X is an ethylenically unsaturated group which can be grafted, Y is an alkyl and/or aryl groups, and R is a $C_1$ to $C_8$ alkoxy group, carboxy groups and/or halogen, and n represents the numbers 1, 2 or 3.

12. The cross-linkable propylene polymer composition of claim 1 or 2, wherein said saturated organosilane compound is a compound having the formula $Z_{4-n}SiR_n$, in which Z represents an epoxyalkyl, a glycidoxyalkyl, a mercaptoalkyl, an aminoalkyl, and/or an isocyanatoalkalyl group, and R represents a $C_1$ to $C_8$ alkoxy group, acetoxy group, and/or halogen, and n represents the numbers 1, 2 or 3.

13. The cross-linkable propylene polymer composition according to claim 1 or 2, wherein said polypropylene polymer has a melt index of about 0.1 to 10.0 g/10 min. at 230° C/2.16 kg.

14. The cross-linkable propylene polymer composition according to claim 1 or 2, wherein the cross-linkable propylene polymer is a polymer selected from the group consisting of a cross-linkable, grafted polypropylene homopolymer, random propylene copolymer, propylene block copolymer, random propylene block copolymer, and elastomeric polypropylene with a melt index of about 0.6 to 9.4 g/10 min. at 230° C/2.16 kg.

15. The cross-linkable propylene polymer composition according to claim 1, wherein said free radical-forming agent is an agent selected from the group consisting of an acyl peroxide, an alkyl peroxide, a hydroperoxide, a ketone peroxide, a perester, a peroxydicarbonate, a peroxyketal, an azo compound and an azonitrile.

16. The cross-linkable propylene polymer composition according to claim 2, wherein the average particle size of the olefinic polymer is about 0.001 to about 7 mm.

17. The cross-linkable olefinic polymer of claim 16, wherein the average particle size of the olefinic polymer is about 0.05 to about 4 mm.

18. The method according to claim 6 or 7, wherein the ethylenically unsaturated organosilane compound is an organosilane compound having the formula $XY_{3-n}SiR_n$, in which X is an ethylenically unsaturated group which can be grafted, Y is an alkyl and/or aryl groups and R is a $C_1$ to $C_8$ alkoxy group, carboxy group, and/or halogen, and n represents the numbers 1, 2 or 3.

19. The method according to claim 6 or 7, wherein the saturated organosilane compound is an organosilane compound has the formula $Z_{4-n}SiR_n$, in which Z represents an epoxyalkyl, a glycidoxyalkyl, a mercaptoalkyl, an aminoalkyl, and/or an isocyanatoalkalyl groups and R represents a $C_1$ to $C_8$ alkoxy group, acetoxy groups and/or halogen, and n represents the numbers 1, 2 or 3.

20. The method according to claim 6 or 7, wherein the mixture further comprises about 0.01 to about 45 parts by weight of at least one additive.

21. The method of claim 6, wherein the thermally decomposing free radical-forming agent is an acyl peroxide, alkyl peroxide, hydroperoxide, ketone peroxide, perester, peroxydicarbonate, peroxyketal, azo compound and/or azonitrile, and the process of heating occurs under inert conditions.

22. The method of claim 6, wherein the first and second step of heating each have a duration of about 1 to about 240 minutes, and the temperature in the second step of heating is about 5 to about 18° C. below the softening temperature or the crystallite melting point of the polymers used.

23. The method of claim 22, wherein the first and second step of heating each have a duration of about 20 to about 50 minutes.

24. The method according to claim 7, wherein the temperature is about 20° to about 80° C. below the softening temperature or the crystallite melting point of the olefinic polymer used.

25. The method according to claim 7, wherein the radiation dose is about 0.01 to about 0.25 Mrd.

26. The method according to claim 9, wherein said pressure is about 0.05 to about 0.5 Mpa.

* * * * *